United States Patent

Kosuge et al.

[11] Patent Number: 6,071,599
[45] Date of Patent: Jun. 6, 2000

[54] POLYESTER FILM FOR METAL LAMINATION AND THE USE THEREOF

[75] Inventors: Masahiko Kosuge; Manabu Kimura, both of Matsuyama; Tetsuo Yoshida, Sagamihara; Koji Kubo, Sagamihara; Hirofumi Murooka, Sagamihara; Tetsuya Hasegawa, Sagamihara, all of Japan

[73] Assignee: Teijin Limited, Osaka, Japan

[21] Appl. No.: 09/142,852

[22] PCT Filed: Sep. 17, 1997

[86] PCT No.: PCT/JP97/03285

§ 371 Date: May 22, 1998

§ 102(e) Date: May 22, 1998

[87] PCT Pub. No.: WO98/12049

PCT Pub. Date: Mar. 26, 1998

[30] Foreign Application Priority Data

| Sep. 18, 1996 | [JP] | Japan | 8-246405 |
| May 19, 1997 | [JP] | Japan | 9-128430 |
| Jun. 9, 1997 | [JP] | Japan | 9-150936 |

[51] Int. Cl.$^7$ ............... B32B 7/02; B32B 15/08; B32B 27/06; B32B 27/36
[52] U.S. Cl. ............ 428/213; 428/220; 428/458; 428/480
[58] Field of Search ............ 428/213, 220, 428/480, 328, 458

[56] References Cited

U.S. PATENT DOCUMENTS

| 4,362,775 | 12/1982 | Yabe et al. | 428/213 |
| 4,390,683 | 6/1983 | Yatsu et al. | 528/194 |
| 5,384,354 | 1/1995 | Hasegawa et al. | 524/539 |
| 5,618,621 | 4/1997 | Hasegawa et al. | 428/343 |
| 5,698,308 | 12/1997 | Sumiya et al. | 428/317.9 |
| 5,874,163 | 2/1999 | Kosuge et al. | 428/212 |
| 5,885,689 | 3/1999 | Hasegawa et al. | 428/141 |

FOREIGN PATENT DOCUMENTS

| 0 580 404 A2 | 1/1994 | European Pat. Off. . |
| 1-22530 | 1/1989 | Japan . |
| 1-192545 | 8/1989 | Japan . |
| 1-192546 | 8/1989 | Japan . |
| 2-57339 | 2/1990 | Japan . |
| 5-339391 | 12/1993 | Japan . |
| 6-218895 | 8/1994 | Japan . |

OTHER PUBLICATIONS

Derwent Acc. No. 1996–093101, Abstract of JP 08001863, Jan. 9, 1996.

Encyclopedia of Polymer Science and Engineering, Polyesters: Thermal Degradation, vol. 12, p. 25, Oct. 1989.

*Primary Examiner*—Paul Thibodeau
*Assistant Examiner*—Ramsey Zacharia
*Attorney, Agent, or Firm*—Sughrue, Mion, Zinn, Macpeak & Seas, PLLC

[57] ABSTRACT

A laminate polyester film to be laminated onto metal plate and molded comprises the first layer made from copoly (ethylene-terephthalate/isophthalate) having a melting point of 205 to 250° C. and a second layer made from a polyester (i) comprising ester units of an aromatic dicarboxylic acid component, an aliphatic dicarboxylic acid component and aliphatic diol components, (ii) containing a titanium compound soluble in the polyester in an amount of 30 to 200 ppm in terms of elemental titanium and (iii) having one or two melting point(s) in the range of 170 to 245° C., and has the maximum peak temperature of loss elastic modulus of higher than 47° C. and 85° C. or lower. This laminate polyester film is suitably used for application such as metal cans for juice and other refreshing drinks that are handled in a cooled state.

20 Claims, No Drawings

POLYESTER FILM FOR METAL LAMINATION AND THE USE THEREOF

DETAILED DESCRIPTION OF THE INVENTION

This invention relates to a polyester film to be laminated onto metal plate and molded. More specifically, it relates to a polyester film to be laminated onto metal plate and molded, which exhibits excellent moldability when a metal plate onto which the film is laminated and subjected to the deep-drawing or the like in a can-making process and which can give metal cans, such as drink cans and food cans, having excellent impact resistance, heat resistance, retort resistance and taste and flavor retention properties.

Metal cans are generally coated on interior and exterior surfaces thereof to be prevented from corrosion. Recently, the development of methods for obtaining corrosion resistance without using an organic solvent has been promoted to simplify production process, improve sanitation and prevent pollution. As one of the methods, coating of a metal can with a thermoplastic resin film has been attempted. That is, studies are under way on a method for making cans by laminating a thermoplastic resin film on a plate of a metal such as tin, tin-free steel or aluminum and then drawing the laminated metal plate. A polyolefin film or polyamide film has been tried as this thermoplastic resin film but could not satisfy all requirements for moldability, heat resistance, flavor retention property and impact resistance.

On the other hand, a polyester film, particularly a polyethylene terephthalate film attracts much attention as a film having well-balanced properties and there have been made some proposals based on the polyethylene terephthalate film.

Japanese Laid-open patent application publications 56-10451 and 1-192546 disclose a can making material formed by laminating a biaxially oriented polyethylene terephthalate film onto a metal plate via a low-melting polyester adhesive layer.

Although this biaxially oriented polyethylene terephthalate film has excellent heat resistance and flavor retention property, its moldability is unsatisfactory with the result that the film is whitened (generation of fine cracks) and ruptured when it is subjected to a can making process which inevitably invites large deformation.

Japanese Laid-open patent application publications 1-192545 and 2-57339 disclose a can-making material formed by laminating an amorphous or extremely low crystalline aromatic polyester film onto a metal plate. Since this can making material comprises an amorphous or extremely low crystalline aromatic polyester film, it is good in moldability but inferior in flavor retention property, and is liable to be embrittled during the post-treatment such as printing or retort sterilization after can-making or during a long-term preservation, and may be changed into a film that easily cracks by an externally exerted impact.

Japanese Laid-open patent application publication 64-22530 discloses a can making material formed by laminating a heat set biaxially oriented polyethylene terephthalate film that has been heat set at a low degree of orientation, onto a metal plate. This film is intended to achieve effects in a domain intermediate area between the above two different types of films but does not yet attain the low orientation applicable to the can-making process. Even if it can be processed in a domain with a small degree of deformation, it is easily embrittled by subsequent printing and retort treatment for sterilizing the contents of a can and may be degraded into a film which easily cracks by an impact exerted from the outside of the can, like the above amorphous and extremely low crystalline film.

U.S. Pat. No. 4,362,775 discloses a polyester film heat-bonded metal plate formed by heat bonding a biaxially oriented polyester film (C) to a metal plate, using an adhesive, the adhesive being a polyblend comprising 5 to 80% by weight of at least one high melting point polyester having a melting point of at least 200° C., and 20 to 95% by weight of at least one low melting point polyester having a melting point of at least 100° C.

Japanese Laid-open patent application publication 6-39981 discloses a polyester film to be laminated onto metal plate and molded, which is a laminate comprising a copolyester layer (A) containing 1% by weight or less of a lubricant having an average particle diameter of 2.5 $\mu$m or less and having a melting point of 210 to 245° C. and a glass transition temperature of 60° C. or higher, and a polyester layer (B) formed from a polyester composition comprising 99 to 60% by weight of a copolyester (I) composed of ethylene terephthalate having a melting point of 210 to 245° C. as a main recurring unit and containing 5 to 30% by weight of a filler having an average particle diameter of 2.5 $\mu$m or less and 1 to 40% by weight of a polyester (II) composed of butylene terephthalate having a melting point of 180 to 223° C. as a main recurring unit.

The polyester composition constituting the polyester layer (B) has two melting points corresponding to the melting points of two polyesters contained therein. This publication does not disclose a titanium compound soluble in a polyester and loss elastic modulus.

U.S. Pat. No. 5,384,354 discloses a polyester film for lamination onto a metal plate for processing of said metal plate, which polyester film is formed substantially from a composition comprising a molten mixture of (A) 99 to 60% by weight of a copolyethylene terephthalate having an ethylene terephthalate unit as the main recurring unit and having a melting point of 210° C. to 245° C.(component A), and (B) 1 to 40% by weight of a polybutylene terephthalate or a copolybutylene terephthalate having a butylene terephthalate unit as the main recurring unit and having a melting point of 180 to 223° C.(component B), and a lubricant having an average particle diameter of 2.5 $\mu$m or less (component C), the film (i) having a plane orientation coefficient of 0.08 to 0.16,
(ii) having a heat shrinkage of 10% or less at 150° C., and
(iii) having a density of 1,385 g/cm$^3$ or less.

The above molten mixture has two melting points corresponding to the melting points of copolyethylene terephthalate and polybutylene terephthalate contained therein. The publication does not disclose a titanium compound soluble in a polyester and loss elastic modulus, either.

U.S. Pat. No. 5,618,621 discloses a biaxially oriented laminated polyester film for use as a film to be bonded to a metal plate, comprising (A) the first layer formed from the first copolyester which is composed of ethylene terephthalate unit as a main recurring unit and has a melting point of 210 to 245° C. and a glass transition temperature of 50° C. or higher, and (B) the second layer formed from a polyester composition containing (B1) a second copolyester which is composed of ethylene terephthalate unit as a main recurring unit and has a melting point of 210 to 245° C., and (B2) the third copolyester which is composed of butylene terephthalate unit as a main recurring unit and has a melting point of 180 to 223° C., the third copolyester being contained in an amount of 1 to 40% by weight based on the total weight of the second copolyester and the third copolyester, the second layer being to constitute a surface to be bonded onto a metal surface when the laminate film is laminated on the metal plate. What has been described of the molten mixture in U.S. Pat. No. 5,384,354 can be also applied to the polyester composition constituting the above second layer.

It is an object of the present invention to provide a polyester film to be laminated onto metal plate and molded, which has improved properties.

It is another object of the present invention to provide a polyester film to be laminated onto metal plate and molded, which is excellent in moldability, heat resistance, retort resistance and flavor retention property as well as impact resistance, particularly impact resistance at a room temperature or below.

It is still another object of the present invention to provide a polyester film to be laminated onto metal plate and molded, which is suitably used for such applications that it is handled in a cooled state, such as metal cans containing juice and refreshing drinks.

Other objects and advantages of the present invention will become apparent from the following description.

According to the present invention, the above objects and advantages of the present invention are attained by a laminate polyester film to be laminated onto metal plate and molded, which comprises (A) the first layer formed from copoly(ethylene-terephthalate/isophthalate) having a melting point of 205 to 250° C., and (B) the second layer formed from a polyester (i) comprising ester units of an aromatic dicarboxylic acid component, aliphatic dicarboxylic acid component and aliphatic diol components, the aromatic dicarboxylic acid component being terephthalic acid, a combination of terephthalic acid and isophthalic acid, a combination of terephthalic acid and phthalic acid, or a combination of terephthalic acid, isophthalic acid and phthalic acid, the aliphatic dicarboxylic acid component being at least one member selected from the group consisting of adipic acid and sebacic acid, and the aliphatic diol components being ethylene glycol, diethylene glycol and tetramethylene glycol, (ii) containing a titanium compound soluble in this polyester in an amount of 30 to 200 ppm in terms of elemental titanium and (iii) having one or two melting point(s) in the range of 170 to 245° C.; and (C) which has the maximum peak temperature of loss elastic modulus of higher than 47° C. and 85° C. or lower.

The laminate polyester film of the present invention consists of the first layer (A) and the second layer (B) and has a loss elastic modulus specified in (C), as described above.

The copoly(ethylene-terephthalate/isophthalate) constituting the first layer has a melting point of 205 to 250° C. The melting point is preferably 210 to 245° C., more preferably 215 to 235° C.

The copoly(ethylene-terephthalate/isophthalate) comprises terephthalic acid and isophthalic acid in a total amount of at least 97 mol % of the total of all dicarboxylic acid components and ethylene glycol in an amount of at least 97 mol % of the total of all glycol components.

Other dicarboxylic acids other than terephthalic acid and isophthalic acid which may be contained in an amount of 3 mol % or less of the total of all dicarboxylic acid components are aromatic dicarboxylic acids such as phthalic acid and naphthalenedicarboxylic acid; aliphatic dicarboxylic acids such as adipic acid, azelaic acid, sebacic acid and decanedicarboxylic acid; and the like. Other diols other than ethylene glycol which may be contained in an amount of 3 mol % or less of the total of all diol components are aliphatic diols such as diethylene glycol, triethylene glycol, butane diol, hexane diol and neopentyl glycol; alicyclic diols such as cyclohexane dimethanol; and the like. The above other dicarboxylic acids and diols may be used alone or in combination of two or more. Terephthalic acid, isophthalic acid, other dicarboxylic acid(s) and other diol(s) are copolymerized in such a ratio that ensures that the melting point of the obtained polymer should be in the above range. If the melting point of the polymer is lower than 205° C., the heat resistance of the obtained laminate film will deteriorate unfavorably. On the other hand, if the melting point is higher than 250° C., the crystallinity of the obtained polymer will be too high, thereby deteriorating the moldability of the laminate film unfavorably.

The above ratio corresponds to a ratio that ensures the total of the ratio of other dicarboxylic acid(s) other than terephthallc acid to the whole dicarboxylic acid component and the ratio of other diol(s) other than ethylene glycol to the whole diol component is about 3 to about 22 mol %, although it differs depending on other dicarboxylic acid(s) and other diol(s) used.

The melting point of the copoly(ethylene-terephthalate/isophthalate) is obtained from a melting peak at a temperature elevation rate of 20° C./min using the Du Point Instruments 910 DSC. The amount of a sample is about 20 mg.

The copoly(ethylene-terephthalate/isophthalate) contains a metal or a metal compound as the polycondensation catalyst. Although the metal compound is not limited to a particular kind, it is an antimony compound, germanium compound, tin compound, calcium compound, magnesium compound or the like.

The intrinsic viscosity of the copoly(ethylene-terephthalate/isophthalate) is preferably 0.52 to 0.80 dl/g, more preferably 0.54 to 0.70 dl/g, particularly preferably 0.57 to 0.65 dl/g. The intrinsic viscosity is obtained from the viscosity of a solution measured in o-chlorophenol at 35° C.

The polyester constituting the second layer is composed of ester units of an aromatic dicarboxylic acid component, aliphatic dicarboxylic acid component and aliphatic diol components. That is, the polyester is composed of ester units of an aromatic dicarboxylic acid and aliphatic diol and ester units of an aliphatic dicarboxylic acid and aliphatic diol.

The aromatic dicarboxylic acid is either one of terephthalic acid alone, a combination of terephthalic acid and isophthalic acid, a combination of terephthalic acid and phthalic acid and a combination of terephthalic acid, isophthalic acid and phthalic acid. The aliphatic dicarboxylic acid is either one or both of adipic acid and sebacic acid. The aliphatic diol is a combination of ethylene glycol, diethylene glycol and tetramethylene glycol.

The polyester constituting the second layer (B) further contains a titanium compound soluble in this polyester in an amount of 30 to 200 ppm in terms of elemental titanium. Although the titanium compound is generally derived from a polyester polymerization catalyst, the above amount is relatively larger than a required amount of a polymerization catalyst.

The amount of the elemental titanium is preferably 40 to 180 ppm, more preferably 50 to 160 ppm. The polyester constituting the second layer (B) may further contain an antimony compound, germanium compound, tin compound, calcium compound, magnesium compound or the like in addition to the titanium compound soluble in the above polyester.

Further, the polyester constituting the second layer (B) has one or two melting point(s) in the range of 170 to 245° C., preferably 190 to 240° C. The measurement method of the melting point is the same as that of the copoly(ethylene-terephthalate/isophthalate) constituting the first layer (A).

The aromatic dicarboxylic acid component of the polyester constituting the second layer (B) is preferably a combination of terephthalic acid and isophthalic acid, a combination of terephthalic acid and phthalic acid, or a combination of terephthalic acid, isophthalic acid and phthalic acid. The above acid(s) other than terephthalic acid in the above combinations, that is, isophthalic acid in the first combination, phthalic acid in the second combination, and isophthalic acid and phthalic acid in the third combination is(are) contained in a proportion of 20 mol % or less of the total of the aromatic dicarboxylic acid component. This proportion is more preferably about 1 to 12 mol %.

Moreover, the aliphatic dicarboxylic acid component of the polyester constituting the second layer (B) is preferably adipic acid.

As for the aromatic dicarboxylic acid component and the aliphatic dicarboxylic acid component constituting the polyester of the second layer (B), the aliphatic dicarboxylic acid component is preferably contained in a proportion of 12 molt or less of the total of the aliphatic dicarboxylic acid component and the aromatic dicarboxylic acid component. The proportion is more preferably 1 to 8 mol %.

As for the proportion of the aliphatic diol component, the proportions of ethylene glycol, diethylene glycol and tetramethylene glycol are 63 to 98.5 molt, 1 to 2 mol % and 0.5 to 36 mol % of the total of all aliphatic diol components, respectively. The proportions are more preferably 63 to 79.5 mol %, 1 to 2 molt and 19.5 to 36 molt, respectively. The polyester forming the second layer (B) can be produced by polycondensing the aromatic dicarboxylic acid component, aliphatic dicarboxylic acid component and aliphatic diol component which have the above compositions in accordance with a direct esterification or ester exchange method which is known per se. Alternatively, two or more polyesters prepared in advance are melt mixed in such a ratio that ensures the above composition to produce the polyester. In either method, as the diethylene glycol component is produced in a reaction system during a is polycondensation reaction in the production of a polyester containing ethylene glycol as a diol component, it is not always necessary to prepare the diethylene glycol component as a material for producing the polyester.

In accordance with the former method out of the above methods, a polyester containing a titanium compound soluble in the polyester in an amount of 30 to 200 ppm in terms of elemental titanium and having one melting point of 170 to 245° C. can be obtained.

The latter method out of the above methods, that is, a method in which two or more polyesters are prepared in advance and melt mixed in such a ratio that ensures the above composition is more preferable as a method for producing the polyester for the second layer (B) in the present invention. According to this method, a polyester containing a titanium compound soluble in the polyester in an amount of 30 to 200 ppm in terms of elemental titanium and having one or two melting point(s) of 170 to 245° C. can be obtained.

In this melt mixing method, the polyester forming the second layer can be advantageously produced as a molten mixture comprising copoly(ethylene-terephthalate/isophthalate) having a melting point of 210 to 245° C. and copoly(ethylene terephthalate/adipate) having a melting point of 170 to 223° C. As a matter of course, a desired molten mixture can be produced from a combination of polyesters other than the above combination.

If the melting point of the copoly(tetramethylene terephthalate/adipate) is lower than 210° C., the heat resistance of the obtained laminate film will deteriorate unfavorably. On the other hand, if the melting point is higher than 245° C., the crystallinity of the obtained polymer will become too high, thereby impairing the moldability of the film unfavorably.

The measurement method of the melting point is the same as that of the copoly(ethylene-terephthalate/isophthalate) constituting the first layer (A).

The copoly(ethylene-terephthalate/isophthalate) of the second layer (B) can be produced using a soluble titanium compound catalyst or other catalyst such as an antimony compound, germanium compound or the like.

The intrinsic viscosity of the copoly(ethylene-terephthalate/isophthalate) is preferably 0.52 to 0.80 dl/g, more preferably 0.54 to 0.70 dl/g, particularly preferably 0.57 to 0.65 dl/g.

The copoly(tetramethylene terephthalate/adipate) has a melting point of 170 to 223° C.

If the melting point is lower than 170° C., the heat resistance of the obtained laminate film will deteriorate unfavorably. The melting point of a polybutylene terephthalate homopolymer is about 223° C.

This melting point is preferably 180 to 215° C., more preferably 180 to 205° C.

The measurement method of this melting point is also the same as described above.

The copoly(tetramethylene terephthalate/adipate) particularly preferably contains an adipic acid component in an amount of 5 to 40 mol % of the total of the terephthalic acid component and the adipic acid component.

The copoly(tetramethylene terephthalate/adipate) is preferably produced using a soluble titanium compound as a catalyst. Illustrative examples of the soluble titanium compound used in the present invention include organic titanates such as tetra-n-butyl titanate, tetra-n-propyl titanate, tetraisopropyl titanate, tetraethyl titanate and tetramethyl titanate and hydrolyzed products thereof; hydrolyzed products of titanium tetrachloride and titanium sulfate; inorganic titanium compounds such as zinc titanium fluoride, potassium titanium fluoride and cobalt titanium fluoride; titanium compounds usually used as a catalyst in the production of a polyester, such as titanium acetate, titanium oxalate and potassium titanate oxalate, and the like. Of these, tetra-n-butyl titanate is preferred. These titanium compounds may be used in combination of two or more. The copoly (tetramethylene terephthalate/adipate) may further contain an antimony compound, germanium compound, tin compound, calcium compound, magnesium compound or the like in addition to the soluble titanium compound. The copoly(tetramethylene terephthalate/adipate) preferably has terminal carboxyl groups in an amount of 1 to 40 eq/$10^6$ g. The terminal carboxyl groups are measured in accordance with a Conix method (Macromol, Chem. vol.26, pp.226 (1958)).

The copoly(tetramethylene terephthalate/adipate) preferably contains only 0.5 wt % at most of oligomers. The content of the oligomers is more preferably 0.4 wt % at most. If the content of the oligomers is larger than 0.5 wt %, an increase in the total amount of the oligomers after the formation of a film will be large, the total amount of the oligomers extracted after a retort treatment will increase, and flavor retention property will deteriorate unfavorably.

The intrinsic viscosity of the copoly(tetramethylene terephthalate/adipate) is preferably 0.70 to 2.0 dl/g, more preferably 0.80 to 1.70 dl/g, particularly preferably 0.85 to 1.5 dl/g.

The above molten mixture which is the polyester forming the second layer (B) comprises 99 to 60 wt % of the copoly(ethylene-terephthalate/isophthalate) and 1 to 40 wt % of the copoly(tetramethylene terephthalate/adipate).

When the proportion of the copoly(ethylene-terephthalate/isophthalate) is larger than 99 wt % and the proportion of the copoly(tetramethylene terephthalate/adipate) is smaller than 1 wt %, it is difficult to obtain a laminate film whose impact resistance at low temperatures is improved to a desired extent, while when the proportion of the copoly(ethylene-terephthalate/isophthalate) is smaller than 60 wt % and the proportion of the copoly (tetramethylene terephthalate/adipate) is larger than 40 wt %, it is difficult to obtain a laminate film having satisfactory heat resistance and impact resistance.

The above molten mixture of the copoly(ethylene-terephthalate/isophthalate) and the copoly(tetramethylene terephthalate/adipate) preferably has a reaction rate (EE, %) defined by the following equation of 3% or higher.

$$EE\ (\%)=SB/(SA+SB+SC)\times 100$$

wherein SA, SB and SC are integral values of peak A, peak B and peak C clearly distinguishable from one another in an $^1$H-NMR chart, respectively, the peak A is based on proton HA having a structure represented by the following formula:

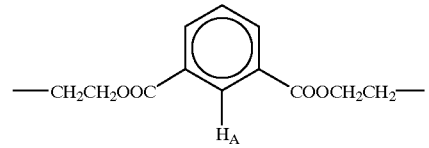

the peak B is based on proton $H_B$ having a structure represented by the following formula:

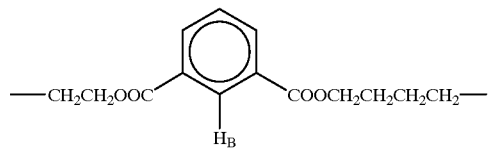

and the peak C is based on proton $H_C$ having a structure represented by the following formula.

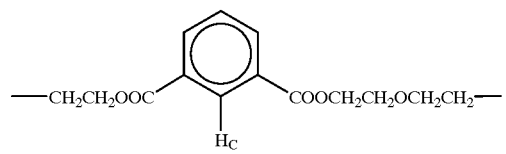

The molten mixture of the copoly(ethylene-terephthalate/isophthalate) and the copoly(tetramethylene terephthaiate/adipate) which is a polyester forming the second laser (B) has one melting point different from the melting points of these copolyesters or two melting points of a melting point different from the melting points of these copolyesters and the melting point of either one of the copolyesters. When the molten mixture has one melting point, a reaction (ester-ester exchange reaction) between the copolymers proceeds at a relatively high rate, while when the molten mixture has two melting points, the reaction does not proceed so far. In this case, the melting point of either one of the copolyesters is substantially equal to the melting point of the copoly (ethylene-terephthalate/isophthalate) which is used in large quantities in many cases.

The ester-ester exchange reaction proceeds advantageously when the polyester of the second layer (B) contains a relatively large amount of the soluble titanium compound, as described above. When both of the above copolyesters do not contain a sufficient amount of the titanium compound, it is preferred to add the soluble titanium compound at the time of melt mixing of the copolyesters.

That is, in the case of a polyester containing the soluble titanium compound in an amount of less than 30 ppm in terms of elemental titanium, when the film is laminated onto a metal plate and deep-drawn, particularly at an extremely high draw ratio, or subjected to higher-order postprocessing, sufficient moldability and impact resistance cannot be obtained, whereby cracks are produced or a film whitening phenomenon occurs at the time of molding unfavorably. In the case of a polyester containing the soluble titanium compound in an amount of more than 200 ppm, on the other hand, the melting heat stability of the polymer degrades, and a reduction in molecular weight at the time of molding is large. When the film is laminated onto a metal plate and deep-drawn, moldability and impact resistance deteriorate unfavorably.

Surprisingly, it has been found that the ester-ester exchange reaction proceeds advantageously when at least one of the copolyesters contains an antioxidant. The antioxidant is preferably the one which is substantially harmless to the human body and stable when a polyester containing an antioxidant is coated under heating onto a metal plate, namely, at 240° C.

Illustrative examples of the antioxidant include phenol group-containing compounds such as tetrakis-(methylene-3-(3',5'-di-tert-butyl-4'-hydroxyphenyl)propionate)methane, stearyl-p-(3,5-di-tert-butyl-4-hydroxyphenyl)propionate, 2,2'-methylene-bis(4-methyl-6-tert-butylphenol), 2,2'-methylene-bis(4-ethyl-6-tert-butylphenol), 4,4'-thiobis(3-methyl-6-tert-butyl-phenol), 4,4'-butylidene-bis(3-methyl-6-tert-butylphenol), 3,9-bis(1,1-dimethyl-2-(β-(3-tert-butyl-4-hydroxy-5-methylphenyl)propionyloxy)ethyl)-2,4,8,10-tetraoxaspyro(5,5)undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 1,3,5-tris(3',5'-di-tert-butyl-4'-hydroxybenzyl)-S-triazine-2,4,6-(1H,3H,5H)trion and tocopherol; sulfur-containing compounds such as dilauryl-3,3'-thiodipropionate, dimyristyl-3,3'-thiodipropionate and distearyl-3,3'-thiodipropionate; and phosphorus-containing compounds such as cyclic neopentanetetraylbis(octadecylphosphite), tris(nonylphenyl)phosphite and cyclic neopentanetetraylbis(2,4-di-tert-butylphenyl)phosphite.

These antioxidants may be used alone or in combination of two or more. At least one phenol group-containing compound is preferably contained. Sulfur-containing compounds and phosphorus-containing compounds are used as secondary antioxidants. When a sulfur-containing compound or a phosphorus-containing compound is used in conjunction with a phenol group-containing compound which serves as a primary antioxidant, a synergistic effect can be obtained.

Of these, tetrakis-(methylene-3-(3',5'-di-tert-butyl-4'-hydroxyphenyl)propionate)methane which is a phenol group-containing compound is preferred.

The antioxidant is preferably contained in the polyester of the second layer (B) in an amount of 5 wt % or less, more preferably 0.01 to 5 wt %. When the proportion is less than 0.01 wt %, the effect of the antioxidant added is hardly observed, while when the proportion is more than 5 wt %, further effect of the antioxidant is hardly obtained.

The antioxidant may be added at the same time when raw materials are charged or just before the raw materials are supplied to a polymerization tank in an esterification reaction or ester exchange reaction for the synthesis of the copolyester. It may be directly added to the polymerization tank for the copolyester after polymerization or mixed with the copolyester by an extruder, heating roll, Banbury mixer or kneader.

Preferably, the laminate polyester film of the present invention further contains a lubricant in an amount of 1 wt % or less to improve winding property (handling property and continuous length) in the film production process.

This lubricant is preferably contained in at least either one of the copoly(ethylene-terephthalate/isophthalate) constituting the first layer (A) and the polyester constituting the second layer (B).

The lubricant may be inorganic or organic while it is preferably inorganic. Inorganic lubricants include silica, alumina, titanium dioxide, calcium carbonate, barium sulfate and the like. Organic lubricants include cross-linked polystyrene, cross-linked silicone resin particles and the like. The lubricant, inorganic or organic, preferably has an average particle diameter of 2.5 μm or less, more preferably 0.05 to 2.2 μm. When the average particle diameter of the lubricant is more than 2.5 μm, a pin hole is produced by a coarse lubricant particle (such as a particle having an average particle diameter of 10 μm or more) as a starting point or a rupture occurs in some case, in a portion deformed by a can-making process such as deep drawing or the like, unfavorably. A lubricant which is preferred from a viewpoint of resistance to pin hole is a monodisperse spherical lubricant having an average particle diameter of 2.5 μm or less and a particle diameter ratio (major diameter/minor diameter) of 1.0 to 1.2. Illustrative examples of the lubricant include spherical silica, spherical zirconium oxide, spherical silicone resin particles and the like.

Although the content of the lubricant is preferably 0.005 to 5 wt %, it may be determined by winding property in the film production process. Generally speaking, it is preferred that a lubricant having a large particle diameter should be contained in small quantities and a lubricant having a small particle diameter should be contained in large quantities. For example, monodisperse silica having an average particle diameter of 2.0 μm is preferably contained in an amount of ca. 0.05 wt % and titanium oxide having an average particle diameter of 0.3 μm is preferably contained in an amount of ca. 0.4 wt %. An opaque film can be obtained by deliberately increasing the content of the fine particles. For example, by adding titanium dioxide in an amount of 5 to 40 wt %, preferably 10 to 20 wt %, a white film can be obtained.

The lubricant is not limited to the above externally added particles. Internally deposited particles obtained by depositing part or all of the catalyst used in the production of the polyester in a reaction process. The externally added particles and the internally deposited particles can be used in conjunction.

The laminate polyester film of the present invention consisting of the first layer (A) and the second layer (B) has the maximum peak temperature of loss elastic modulus at a temperature ranging from higher than 47° C. to 85° C. or lower.

If the maximum peak temperature of loss elastic modulus is higher than 85° C., sufficient low-temperature impact resistance cannot be obtained, while if it is lower than 47° C., heat resistance may deteriorate and conversely impact resistance may be lost.

The maximum peak temperature of loss elastic modulus is preferably 50 to 85° C., more preferably 50 to 75° C., particularly preferably 50 to 70° C.

The maximum peak temperature of loss elastic modulus depends on the composition of the polyester forming the second layer (B), the blend ratio of the copolyesters when the polyester is a molten mixture of the copolyesters, and stretch ratio and stretch temperature when the film is biaxially oriented.

The laminate polyester film of the present invention can be produced, for example, by melting a polyester forming the first layer (A) and a polyester forming the second layer (B) separately, co-extruding the polyesters into films, laminating them to fuse together before solidification, biaxially orienting the resulting laminate and heat setting it, or by melting the polyesters separately, extruding them into films, laminating them together and then stretching or stretching and then laminating them together, and heat setting the resulting laminate before or after lamination after stretching.

The laminate polyester film to be laminated onto metal plate and molded of the present invention may be an unstretched film but preferably a biaxially oriented film which is stretched biaxially and heat set. In this case, the refractive index in the thickness direction of the first layer (A) is preferably 1.490 to 1.550, more preferably more than 1.505 and 1.540 or less. If the refractive index is too low, moldability will be unsatisfactory, while if it is too high, the film has an amorphous structure with the consequence that heat resistance may deteriorate.

The laminate polyester film to be laminated onto metal plate and molded of the present invention preferably has a thickness of 6 to 75 $\mu$m, more preferably 10 to 75 $\mu$m, particularly preferably 15 to 50 $\mu$m. If the thickness is smaller than 6 $\mu$m, a rupture or the like is liable to occur upon molding. If the thickness is larger than 75 $\mu$m, the quality will be excessively high uneconomically.

The ratio ($T_A/T_B$) of the thickness $T_A$ of the first layer (A) to the thickness $T_B$ of the second layer (B) is preferably 0.02 to 1.5, more preferably 0.02 to 0.67, the most preferably 0.04 to 0.67, particularly preferably 0.04 to 0.25. Stated more specifically, in the case of a polyester film having a thickness of 20 $\mu$m, the first layer (A) should be made as thick as 0.5 to 15 $\mu$m, preferably 1 to 10 $\mu$m, more preferably 1 to 4 $\mu$m.

The extraction of the laminate polyester film to be laminated onto metal plate and molded of the present invention is preferably 0.5 mg/inch$^2$ or less when it is extracted with ion exchange water at 121° C. for 2 hours.

As the metal plate to be laminated with the laminate polyester film to be laminated onto metal plate and molded of the present invention, particularly a metal plate for making cans, a tinplate, tin-free steel or aluminum plate is suitable.

The lamination of the film on the metal plate can be carried out in accordance with the following methods (a) or (b).

(a) After the film is laminated on the metal plate heated at a temperature higher than the melting point of the film, the metal plate is cooled to make the surface layer portion (thin layer portion) of the film in contact with the metal plate amorphous to allow the film to be bonded thereto.

(b) The film is primer coated with an adhesive on one surface and laminated on the metal plate in such a manner that the surface comes into contact with the metal plate. Known resin adhesives such as epoxy adhesives, epoxy-ester adhesives and alkyd adhesives can be used as the adhesive.

When the laminate polyester film of the present invention is to be laminated on the metal plate, it is laminated in such a manner that the second layer (B) comes into contact with the metal plate.

Further, in the polyester film of the present invention, an additional layer may be laminated between the first layer (A) and the second layer (B) or on either one of the layers as required.

The metal plate laminated with the laminate polyester film of the present invention is suitably used to make a metal can by deep-drawing.

The following examples are given to further illustrate the present invention.

In the present invention, the physical property values of the film were measured and evaluated in the following manners.

In the following measurement and evaluation methods, in the measurement conditions or evaluation criteria of Examples 4 to 16 and Comparative Examples 6 to 12, measurement conditions or criteria different from those of Examples 1 to 3 and Comparative Examples 1 to 5 are shown within parentheses.

(1) Content of titanium compound soluble in polyester

A sample polymer is dissolved in a solvent (such as a mixture solution of chloroform and hexafluoroisopropanol) and an insoluble titanium compound (such as titanium oxide particles) is centrifuged, a residual supernatant is evaporated to obtain a dry solid polymer. A solution prepared by wet dissolving this polymer with a sulfuric acid/nitric acid mixture solution (1/1) is subjected to ICP emission spectral analysis to determine the quantity of titanium metal.

(2) Maximum peak temperature of loss elastic modulus

Using a dynamic visco-elasticity measuring instrument, the maximum peak temperature of loss elastic modulus is measured at a frequency of 10 Hz and a dynamic displacement of $\pm 25 \times 10^{-4}$ cm.

(3) Content of oligomers

10 Mg of a sample is dissolved in 2 ml of a mixture solution of chloroform and hexafluoroisopropanol (volume ratio of 3/2), and chloroform is further added to dilute the solution to an amount of 10 ml. The total quantity of oligomers contained in the solution is determined by gel permeation chromatography (column: TSKgel.G2000H8 7.5 mmID×60 cm of Tosoh Corporation) using chloroform as a solvent and the total quantity of oligomers of monomer to pentomer is taken as the content of oligomers.

(4) Amount of extract with ion exchange water 3.10 Ml of water is used per 1 inch$^2$ of the surface area of one side of a polyester film to carry out an extraction test at 121° C. for 2 hours. The obtained extract is evaporated and dried to obtain a residue. This residue is weighed to obtain the quantity of an extract per 1 inch$^2$ of the surface area of one side of the film.

(5) Lamination property

The film is laminated on a tin-free steel plate heated at a temperature higher than the melting point of a polyester and then cooled to obtain a coated steel plate. The lamination property of this coated steel plate is evaluated based on the following criteria.

(A) criteria based on air bubbles and wrinkles

○: No air bubbles and wrinkles is observed.

Δ: A few air bubbles and wrinkles are observed per 10 m of length. ×: Many air bubbles and wrinkles are observed.

(B) criteria based on heat shrinkage ○: shrinkage of less than 2 %

Δ: shrinkage of 2% or more and less than 5%
×: shrinkage of 5% or more (6) Deep drawability-1

A tin-free steel plate laminated with a film is molded into a container having a diameter of 50 mm (55 mm), a height of 150 mm and a seamless side (to be referred to as "can" hereinafter), by a dice and punch. This can is observed and tested as follows and evaluated based on the following criteria.

○: There is no abnormality in the film, and whitening or rupture of the molded film is not observed.
Δ: Whitening of the film is observed at a top portion of the can.
×: Rupture is observed in part of the film.

(7) Deep drawability-2

⊚: The film is molded without abnormality and exhibits 0.005 mA or less in an anti-corrosion test on the inner film surface of the can (when the can is charged with a 1% NaCl aqueous solution, an electrode is inserted into the can and a voltage of 6V is applied with the can body used as an anode, and a current value is measured. This test is called "ERV test" hereinafter).
○: The film exhibits 0.005 to 0.05 mA in the ERV test.
Δ: The film exhibits 0.05 to 0.1 mA In the ERV test.
×: The film exhibits 0.1 mA or more in the ERV test and a crack is observed when electricity passes is magnified for observation.

(8) Adhesion

Well deep-drawn cans are filled with water and subjected to a retort treatment at 120° C. for 90 minutes in a steam sterilizer. Thereafter, the cans are kept at 50° C. for 3 months. The resulting cans are cut cross to observe the adhesion state of the film.

○: The film is firmly adhered to the metal surface and does not peel off even when it is cut cross.
Δ: Slight reduction in the adhesion of the film by cutting cross is observed.
×: The film peels off when it is cut cross.

(9) Corrosion resistance

Well deep-drawn cans are filled with a 5% acetic acid aqueous solution and held at 501C for 2 weeks. 10 Cans for each test are visually observed and evaluated for the formation of rust in the metal plates.

○: The formation of rust is not observed in all 10 cans.
Δ: The formation of rust is observed in 1 to 5 cans.
×: The formation of rust is observed in 6 or more cans.

(10) Impact resistance

Well deep-drawn cans are filled with water and cooled at 10° C. 10 Cans for each test are dropped on the polyvinyl chloride (abbreviated as "PVC" hereinafter) resin tiled floor from a height of 2 m (30 cm), and the content of the can after one month preservation is evaluated according to an ERV test.

○: All 10 cans exhibit 0.1 mA (0.2 mA) or less.
Δ: 1 to 5 cans exhibit 0.1 mA (0.2 mA) or more.
×: 6 or more cans exhibit 0.1 mA (0.2 mA) or more, or a crack is observed in the film after dropping.

(11) Resistance to thermal embrittlement

Well deep-drawn cans are held at 210° C. for 10 minutes (200° C.×5 minutes) and then the impact resistance thereof is evaluated as described in (9).

○: All 10 cans exhibit 0.1 mA or less.
Δ: 1 to 5 cans exhibit 0.1 mA or more.
×: 6 or more cans exhibit 0.1 mA or more, or a crack is observed in the film after it is heated at 210° C. for 5 minutes.

(12) Retort resistance

Well deep-drawn cans are filled with water, subjected to a retort treatment at 120° C. for 90 minutes (120° C. for 1 hour) in a steam sterilizer and thereafter, kept at 50° C. for 30 days. 10 Cans for each test are dropped on the polyvinyl chloride tiled floor from a height of 50 cm (1 m) and an ERV test is carried out on the cans.

○: All 10 cans exhibit 0.1 mA (2 mA) or less.
Δ: 1 to 5 cans exhibit 0.1 mA (2 mA) or more.
×: 6 or more cans exhibit 0.1 mA (2 mA) or more, or a crack is observed in the film after dropping.

(13) Taste retention property-1

A cut sheet of 21 cm×30 cm is obtained by cutting a polyester film and this sample film is immersed in 300 ml of ion exchange water and kept at normal temperature (20° C.) for 3 months. Thirty panelists taste this immersion solution to compare it with ion exchange water as reference and evaluate it based on the following criteria.

⊚: 4 or less of 30 panelists judge that the immersion solution tastes worse than the reference solution.
○: 5 to 6 of 30 panelists judge that the immersion solution tastes worse than the reference solution.
Δ: 7 to 9 of 30 panelists Judge that the immersion solution tastes worse than the reference solution.
×: 10 or more of 30 panelists judge that the immersion solution tastes worse than the reference solution.

(14) Flavor retention property-1

Well deep-drawn cans are filled with cider and sealed. They are kept at 37° C for 30 days and opened. A change in flavor is checked by a sensory test and evaluated based on the following criteria.

○: There is no change in flavor.
Δ: A slight change in flavor is perceived.
×: A change in flavor is perceived.

(15) Taste retention property-2

A change in taste is checked by an organoleptic test in the same manner as in (14) above and evaluated based on the following criteria.

○: There is no change in taste.
Δ: A slight change in taste is perceived.
×: A change in taste is perceived. ps (16) Ester exchange rate About 10 mg of the polyester composition is cut off from a sample film and dissolved in a mixture solvent of $CDCl_3$ and $CF_3COOD$, and the ester exchange rate is calculated from the integral values of peaks SA, SB and SC measured by 600 Mhz $^1$H-NMR based on the following equation.

$$EE\ (\%)=SB/(SA+SB+SC)\times 100$$

SA, SB and SC are integral values of peak A, peak B and peak C clearly distinguishable from one another in an $^1$H-NMR chart, respectively, the peak A is based on proton $H_A$ having a structure represented by the following formula:

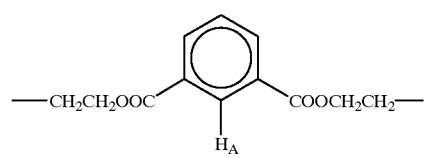

the peak B is based on proton $H_B$ having a structure represented by the following formula:

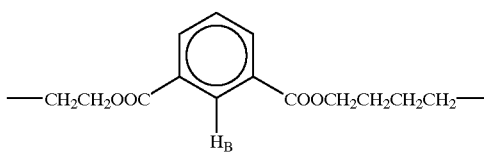

and the peak C is based on proton $H_C$ having a structure represented by the following formula.

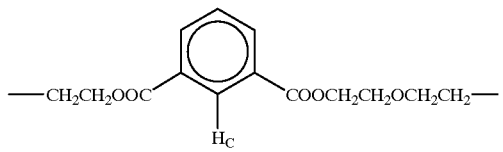

EXAMPLES 1 TO 3 AND COMPARATIVE EXAMPLES 1 TO 4

Copolybutylene terephthalate (copolyester (I)) prepolymers having an intrinsic viscosity of 0.70 and prepared by copolymerizing copolymer components shown in Table 1 was produced by melt polycondensation using tetrabutoxy titanate as a titanium compound, which was used as a catalyst, in such an amount that the amount of titanium metal became a value shown in Table 1. Thereafter, each of the copolyester (I) prepolymers was pelletized, dried at 160° C. for 4 hours, precrystallized, and then polymerized in a solid state in a nitrogen gas stream using a normal pressure fluidized bed solid-phase polymerization apparatus to obtain a copolyester (I) having an intrinsic viscosity of 1.1 and an oligomer content of 0.40 wt % (0.50 wt % for Comparative Example 3).

Polyester compositions for a polyester layer (B) (adhesive layer) were prepared by melt blending the thus obtained copolyester (I) and an aromatic polyester (II) prepared separately (having a composition and melting point shown in Table 1 and containing 0.3 wt % of spherical silica having an intrinsic viscosity of 0.70 and an average particle diameter of 1.0 μm). Separately, aromatic polyesters (III) for a polyester layer (A) (intrinsic viscosity of 0.70) having a composition, a melting point and a glass transition temperature shown in Table 1 were prepared. They were then dried and molten by a commonly used method independently and thereafter, co-extruded from adjacent dies to be laminated, fused together, and solidified by quenching to prepare unstretched laminate films. Then, each of the unstretched laminate films was stretched to 3.0 times at 100° C. in a longitudinal direction and, then, to 3.0 times in a transverse direction, while changing the temperature and the amount of hot air to be blown thereto, and heat set at 180° C. to obtain biaxially oriented laminate polyester films.

COMPARATIVE EXAMPLE 5

A biaxially oriented film was obtained in the same manner as in Example 1 except that only the aromatic polyester (III) of Example 1 was melt extruded into a 25 μm-thick single-layer film.

TABLE 1

| | Polyester layer (A) Aromatic polyester (III) | | | | |
|---|---|---|---|---|---|
| | Basic component | Copolymer component | | Tm ° C. | Tg ° C. |
| | | Composition | Mol % | | |
| Ex. 1 | PET | IA | 12 | 229 | 73 |
| Ex. 2 | PET | IA | 12 | 229 | 73 |
| Ex. 3 | PET | IA | 12 | 229 | 73 |
| C. Ex. 1 | PET | IA | 12 | 229 | 73 |
| C. Ex. 2 | PET | IA | 12 | 229 | 73 |
| C. Ex. 3 | PET | IA | 12 | 229 | 73 |
| C. Ex. 4 | PET | IA | 12 | 229 | 73 |
| C. Ex. 5 | PET | IA | 12 | 229 | 73 |

| | Polyester layer (B) Copolyester (I) | | | | | |
|---|---|---|---|---|---|---|
| | Basic component | Copolymer Component | | Amount of titanium metal ppm | Concentration of Antioxidant wt % | Weight wt % |
| | | Composition | Mol % | | | |
| Ex. 1 | PBT | AA | 25 | 120 | 0.2 | 40 |
| Ex. 2 | PBT | AA | 25 | 50 | 0.2 | 40 |
| Ex. 3 | PBT | SA | 20 | 120 | 0.2 | 40 |
| C. Ex. 1 | PBT | AA | 25 | 8 | 0.2 | 40 |
| C. Ex. 2 | PBT | AA | 25 | 220 | 0.2 | 40 |

TABLE 1-continued

| | | | | | | |
|---|---|---|---|---|---|---|
| C. Ex. 3 | PBT | IA | 25 | 120 | 0.2 | 40 |
| C. Ex. 4 | PBT | None | 0 | 120 | 0.2 | 40 |
| C. Ex. 5 | — | — | — | — | — | — |

| | Polyester layer (B) Aromatic Polyester (II) | | | | |
|---|---|---|---|---|---|
| | Basic | Copolymer component | | Tm | Weight |
| | component | Composition | Mol % | °C. | wt % |
| Ex. 1 | PET | IA | 12 | 229 | 60 |
| Ex. 2 | PET | IA | 12 | 229 | 60 |
| Ex. 3 | PET | IA | 12 | 229 | 60 |
| C Ex. 1 | PET | IA | 12 | 229 | 60 |
| C Ex. 2 | PET | IA | 12 | 229 | 60 |
| C Ex. 3 | PET | IA | 12 | 229 | 60 |
| C Ex. 4 | PET | IA | 12 | 229 | 60 |
| C Ex. 5 | — | — | — | — | — |

Ex.: Example
C. Ex.: Comparative Example

In Table 1, IA stands for isophthalic acid, AA for adipic acid, SA for sebacic acid, PET for polyethylene terephthalate, and PBT for polybutylene terephthalate. Tg indicates a glass transition temperature and Tm a melting point.

The thus obtained biaxially oriented film was laminated on a tin-free steel plate heated at a temperature higher than the melting point of the polyester and cooled to prepare a coated steel plate. This coated steel plate was further molded into a can having a seamless side by a dice and punch.

The lamination property, moldability, adhesion and other characteristic properties of the can are shown in Table 2.

TABLE 2

| | Lamination property | | Deep draw- ability-1 | Deep draw- ability-2 | Adhesion | Corrosion resistance | Impact resistance | Resistance to thermal embrittle- ment | Retort resistance | Taste retention property-1 |
|---|---|---|---|---|---|---|---|---|---|---|
| | (A) | (B) | | | | | | | | |
| Ex. 1 | ○ | ○ | ○ | ○ | ○ | ○ | ⊙ | ○ | ○ | ⊙ |
| Ex. 2 | ○ | ○ | ○ | ○ | ○ | ○ | ○ | ○ | ○ | ⊙ |
| Ex. 3 | ○ | ○ | ○ | ○ | ○ | ○ | ○ | ○ | ○ | ⊙ |
| C. Ex. 1 | ○ | ○ | ○ | Δ | Δ | Δ | X | Δ | X | ○ |
| C. Ex. 2 | ○ | ○ | ○ | Δ | ○ | ○ | Δ | X | Δ | Δ |
| C. Ex. 3 | ○ | ○ | ○ | Δ | ○ | ○ | Δ | ○ | ○ | Δ |
| C. Ex. 4 | ○ | ○ | Δ | Δ | Δ | ○ | Δ | ○ | X | Δ |
| C. Ex. 5 | ○ | ○ | Δ | X | — | — | — | — | — | — |

Ex.: Example
C. Ex.: Comparative Example

In Table 2, "-" means that evaluation was not carried out.

As is evident from the results of Table 2, cans made from the laminate polyester film of the present invention are satisfactory in terms of lamination property, deep drawability, resistance to thermal embrittlement, retort resistance and corrosion resistance, and particularly excellent in flavor retention property and impact resistance.

The total amount of oligomers contained in each of the copolyesters (I) and the amount of an extract from each of the biaxially oriented films with water are shown in Table 3.

TABLE 3

| | Total amount of oligomer contained in copolyester (I) (wt %) | Amount of extract from film with ion exchange water (mg/inch$^2$) |
|---|---|---|
| Ex. 1 | 0.40 | 0.35 |
| Ex. 2 | 0.40 | 0.35 |
| Ex. 3 | 0.40 | 0.35 |
| C. Ex. 1 | 0.40 | 0.35 |

TABLE 3-continued

| | Total amount of oligomer contained in copolyester (I) (wt %) | Amount of extract from film with ion exchange water (mg/inch$^2$) |
|---|---|---|
| C. Ex. 2 | 0.40 | 0.35 |
| C. Ex. 3 | 0.50 | 0.45 |
| C. Ex. 4 | 0.40 | 0.35 |
| C. Ex. 5 | 0.40 | 0.35 |

Ex.: Example
C. Ex.: Comparative Example

EXAMPLE 4 TO 9 AND COMPARATIVE EXAMPLE 6 TO 9

Copolyethylene terephthalates (intrinsic viscosity of 0.64) for the copolyester layer (A) comprising each a copolymer component shown in Table 4 and polyester compositions shown-in Table 4 for the polyester composition layer (B) were, respectively, separately dried by a commonly used method, then molten at 280° C. and co-extruded from adjacent dies to be laminated, fused together and solidified by quenching to form unstretched films. The ester exchange rate of the polyester composition for the layer B was set by changing the above-mentioned melting temperature.

Thereafter, the unstretched films were stretched to 3.2 times at 130° C. in a longitudinal direction and to 3.3 times at 120° C. in a transverse direction, and heat set at 180° C. to obtain biaxially oriented laminate films.

The obtained laminate films were 25 μm thick, and the copolyester layer (A) and the polyester composition layer (B) were 5 μm and 20 μm thick, respectively.

TABLE 4

| | Copolyester layer (A) | | | |
|---|---|---|---|---|
| | Copolymer component | | Melting | Glass transition temperature |
| | Composition | Mol % | point ° C. | ° C. |
| Ex. 4 | Isophthalic acid | 9 | 235 | 74 |
| Ex. 5 | Isophthalic acid | 9 | 235 | 74 |
| Ex. 6 | Isophthalic acid | 9 | 235 | 74 |
| Ex. 7 | Isophthalic acid | 9 | 235 | 74 |
| Ex. 8 | Isophthalic acid | 9 | 235 | 74 |
| Ex. 9 | Isophthalic acid | 9 | 235 | 74 |
| C. Ex. 6 | Isophthalic acid | 20 | 208 | 71 |
| C. Ex. 7 | Isophthalic acid | 2 | 252 | 76 |
| C. Ex. 8 | Sebacic acid | 9 | 235 | 55 |
| C. Ex. 9 | Isophthalic acid | 9 | 235 | 74 |

Ex.: Example
C. Ex.: Comparative Example

TABLE 4 (continued)

| | Polyester composition layer (B) Co-PET | | | | |
|---|---|---|---|---|---|
| | Copolymer component | | Melting | Intrinsic viscosity before | Proportion |
| | Composition | Mol % | point ° C. | blending | wt % |
| Ex. 4 | Isophthalic acid | 5 | 245 | 0.65 | 70 |
| Ex. 5 | Isophthalic acid | 5 | 245 | 0.65 | 70 |
| Ex. 6 | Isophthalic acid | 5 | 245 | 0.65 | 70 |
| Ex. 7 | Isophthalic acid | 5 | 245 | 0.65 | 70 |
| Ex. 8 | Isophthalic acid | 5 | 245 | 0.65 | 60 |
| Ex. 9 | Isophthalic acid | 11 | 228 | 0.65 | 70 |
| C. Ex. 6 | Isophthalic acid | 6 | 243 | 0.71 | 70 |
| C. Ex. 7 | Isophthalic acid | 6 | 243 | 0.71 | 70 |
| C. Ex. 8 | Isophthalic acid | 6 | 243 | 0.71 | 70 |
| C. Ex. 9 | Isophthalic acid | 3 | 250 | 0.65 | 70 |

Ex.: Example
C. Ex.: Comparative Example
(Notes) PET: polyethylene terephthalate

TABLE 4 (continued)

| | Polyester composition layer (B) PBT or co-PBT | | | | | Ester exchange rate of copolyester layer (B) |
|---|---|---|---|---|---|---|
| | Copolymer component | | Melting | Intrinsic viscosity before | Proportion | |
| | Composition | Mol % | point ° C. | blending | wt % | |
| Ex. 4 | Adipic acid | 20 | 195 | 0.90 | 30 | 7.0 |
| Ex. 5 | Adipic acid | 20 | 195 | 1.50 | 30 | 8.0 |

TABLE 4-continued (continued)

| | Polyester composition layer (B) PBT or co-PBT | | | | | Ester exchange rate of copolyester layer (B) |
|---|---|---|---|---|---|---|
| | Copolymer component | | Melting point ° C. | Intrinsic viscosity before blending | Proportion wt % | |
| | Composition | Mol % | | | | |
| Ex. 6 | Adipic acid | 15 | 204 | 0.90 | 30 | 6.5 |
| Ex. 7 | Adipic acid | 25 | 186 | 0.90 | 30 | 7.5 |
| Ex. 8 | Adipic acid | 20 | 195 | 0.90 | 40 | 7.5 |
| Ex. 9 | Adipic acid | 20 | 195 | 0.90 | 30 | 7.5 |
| C. Ex. 6 | — | — | 223 | 1.10 | 30 | 5.0 |
| C. Ex. 7 | — | — | 223 | 1.10 | 30 | 5.0 |
| C. Ex. 8 | — | — | 223 | 1.10 | 30 | 5.0 |
| C. Ex. 9 | Adipic acid | 20 | 195 | 0.90 | 30 | 2.5 |

Ex.: Example
C. Ex.: Comparative Example
(Notes) PBT: polybutylene terephthalate Each of the films obtained in the above Examples 4 to 9 and Comparative Examples 6 to 9 was laminated on both sides of a 0.25 mm-thick tin-free steel plate heated at 230° C. in such a manner that the polyester layer (B) came into contact with the tin-free steel plate, cooled with water and cut into a disk form having a diameter of 150 mm. The disk-shaped coated plate was deep drawn in four stages by a drawing dice and punch to produce a 55 mm-diameter container (to be referred to as "can" hereinafter) having a seamless side.

The cans were observed and tested as shown in Table 5 and evaluated based on the following criteria. The evaluation results are shown in Table 5.

respectively, separately dried by a commonly used method, molten at 280° C. and thereafter, co-extruded from adjacent dies to be laminated, fused together and then solidified by quenching to form unstretched films.

Thereafter, the unstretched films were stretched to 3.2 times at 110° C. in a longitudinal direction and to 3.3 times at 120° C. in a transverse direction, and heat set at 180° C. to obtain biaxially oriented laminate films.

The obtained laminate films were 20 μm thick, and the first layer (A) and the second layer (B) were 4 μm and 16 μm thick, respectively.

TABLE 5

| | Deep draw-ability-1 | Impact resistance | Resistance to thermal embrittlement | Retort resistance | Flavor retention property-1 | Taste retention property-2 |
|---|---|---|---|---|---|---|
| Ex. 4 | ○ | ○ | ○ | ○ | ○ | ○ |
| Ex. 5 | ○ | ○ | ○ | ○ | ○ | ○ |
| Ex. 6 | ○ | ○ | ○ | ○ | ○ | ○ |
| Ex. 7 | ○ | ○ | ○ | ○ | ○ | ○ |
| Ex. 8 | ○ | ○ | ○ | ○ | ○ | ○ |
| Ex. 9 | ○ | ○ | ○ | ○ | ○ | ○ |
| C. Ex. 6 | X | X | X | X | ○ | ○ |
| C. Ex. 7 | X | — | — | — | — | — |
| C. Ex. 8 | ○ | ○ | ○ | ○ | X | Δ |
| C. Ex. 9 | ○ | X | ○ | Δ | ○ | ○ |

Ex.: Example
C. Ex.: Comparative Example
(Note) —: Unable to be evaluated due to a deep drawing failure.

EXAMPLES 10 TO 16 AND COMPARATIVE EXAMPLES 10 TO 12

Copolyethylene terephthalates (intrinsic viscosity of 0.64) for the first layer (A), which were prepared by copolymerizing components shown in Table 6 and a polyester composition shown in Table 6 for the second layer (B) were,

TABLE 6

| | Copolyester layer (A) | | |
|---|---|---|---|
| | Copolymer Component | | Melting point |
| | Composition | Mol % | ° C. |
| Ex. 10 | Isophthalic acid | 12 | 229 |
| Ex. 11 | Isophthalic acid | 18 | 214 |

TABLE 6-continued

| | Copolyester layer (A) | | |
|---|---|---|---|
| | Copolymer Component | | Melting point |
| | Composition | Mol % | ° C. |
| Ex. 12 | Isophthalic acid | 6 | 243 |
| Ex. 13 | Isophthalic acid | 12 | 229 |
| Ex. 14 | Isophthalic acid | 12 | 229 |
| Ex. 15 | Isophthalic acid | 12 | 229 |
| Ex. 16 | Isophthalic acid | 12 | 229 |
| C. Ex. 10 | Isophthalic acid | 12 | 229 |
| C. Ex. 11 | Isophthalic acid | 12 | 229 |
| C. Ex. 12 | Isophthalic acid | 12 | 229 |

Ex.: Example
C. Ex.: Comparative Example

TABLE 6 (continued)

| | Polyester layer (B) Co-PET | | | |
|---|---|---|---|---|
| | Copolymer component | | Melting point | Weight |
| | Composition | Mol % | ° C. | % |
| Ex. 10 | Isophthalic acid | 6 | 243 | 70 |
| Ex. 11 | Isophthalic acid | 6 | 243 | 70 |
| Ex. 12 | Isophthalic acid | 6 | 243 | 70 |
| Ex. 13 | Isophthalic acid | 18 | 214 | 70 |
| Ex. 14 | Isophthalic acid | 6 | 243 | 70 |
| Ex. 15 | Adipic acid | 6 | 243 | 70 |
| Ex. 16 | Isophthalic acid | 6 | 243 | 70 |
| C. Ex. 10 | Isophthalic acid | 4 | 248 | 70 |
| C. Ex. 11 | Isophthalic acid | 6 | 243 | 70 |
| C. Ex. 12 | Isophthalic acid | 6 | 243 | 55 |

Ex.: Example
C. Ex.: Comparative Example

TABLE 6 (continued)

| | Polyester layer (B) PBT or co-PBT | | | |
|---|---|---|---|---|
| | Copolymer component | | Melting point | Weight |
| | Composition | Mol % | ° C. | % |
| Ex. 10 | Adipic acid | 20 | 195 | 30 |
| Ex. 11 | Adipic acid | 20 | 195 | 30 |
| Ex. 12 | Adipic acid | 20 | 195 | 30 |
| Ex. 13 | Adipic acid | 20 | 195 | 30 |
| Ex. 14 | Adipic acid | 10 | 209 | 30 |
| Ex. 15 | — | — | 223 | 30 |
| Ex. 16 | Adipic acid | 25 | 185 | 30 |
| C. Ex. 10 | Adipic acid | 25 | 185 | 30 |
| C. Ex. 11 | — | — | 223 | 30 |
| C. Ex. 12. | Adipic acid | 20 | 195 | 45 |

Ex.: Example
C. Ex.: Comparative Example

Table 7 shows the maximum peak temperature of the loss elastic modulus of each of the obtained films.

Each of the films obtained in the above Examples 10 to 16 and Comparative Examples 10 to 12 was laminated on both sides of a 0.25 mm-thick tin-free steel plate heated at 230° C. in such a manner that the polyester composition layer (B) came into contact with the tin-free steel plate, cooled with water and cut into a disk form having a diameter of 150 mm. The disk-shaped coated plate was deep drawn in four stages by a drawing dice and punch to produce a 55 mm-diameter container (may be referred to as "can" hereinafter) having a seamless side. These cans were observed, tested and evaluated.

The evaluation results are shown in Table 7.

TABLE 7

| | Maximum peak temperature of loss elastic modulus ° C. | Deep draw-ability-1 | Impact resistance | Resistance to thermal embrittlement | Retort resistance | Flavor retention property-2 | Taste retention property | Overall evaluation |
|---|---|---|---|---|---|---|---|---|
| Ex. 10 | 72 | ◯ | ◯ | ◯ | ◯ | ◯ | ◯ | ◯ |
| Ex. 11 | 70 | ◯ | ◯ | ◯ | ◯ | ◯ | ◯ | ◯ |
| Ex. 12 | 75 | ◯ | ◯ | ◯ | ◯ | ◯ | ◯ | ◯ |
| Ex. 13 | 65 | ◯ | ◯ | ◯ | ◯ | ◯ | ◯ | ◯ |
| Ex. 14 | 82 | ◯ | ◯ | ◯ | ◯ | ◯ | ◯ | ◯ |
| Ex. 15 | 65 | ◯ | ◯ | ◯ | ◯ | ◯ | ◯ | ◯ |
| Ex. 16 | 60 | ◯ | ◯ | ◯ | ◯ | ◯ | ◯ | ◯ |
| C. Ex. 10 | 80 | X | — | — | — | — | — | X |

TABLE 7-continued

|  | Maximum peak temperature of loss elastic modulus ° C. | Deep draw-ability-1 | Impact resistance | Resistance to thermal embrittlement | Retort resistance | Flavor retention property-2 | Taste retention property | Overall evaluation |
|---|---|---|---|---|---|---|---|---|
| C. Ex. 11 | 87 | Δ | X | — | — | — | — | X |
| C. Ex. 12 | 47 | ◯ | ◯ | Δ | Δ | ◯ | Δ | Δ |

Ex.: Example
C. Ex.: Comparative Example

As is evident from the results of Table 7, cans made from the polyester film of the present invention are excellent in deep drawability, resistance to thermal embrittlement, retort resistance and flavor retention property as well as impact resistance, particularly impact resistance at low temperatures, and does not deteriorate the taste of a refreshing drink contained therein.

We claim:

1. A laminate polyester film to be laminated onto metal plate and molded, which comprises:
   (A) a first layer made from copoly(ethylene-terephthalate/isophthalate) having a melting point of 205 to 250° C., and
   (B) a second layer made from a polyester (i) comprising ester units of an aromatic dicarboxylic acid component, an aliphatic dicarboxylic acid component and aliphatic diol components, the aromatic dicarboxylic component being terephthalic acid, a combination of terephthalic acid and isophthalic acid, a combination of terephthalic and phthalic acid, or a combination of terephthalic acid, isophthalic acid and phthalic acid, the aliphatic dicarboxylic acid component being one member selected from the group consisting of adipic acid and a combination of adipic acid and sebacic acid, and the aliphatic diol components being ethylene glycol, diethylene glycol, and tetramethylene glycol, (ii) containing a titanium compound soluble in the polyester in an amount of 30 to 200 ppm in terms of elemental titanium and (iii) having one or two melting point(s) in the range of 170 to 245° C., and
   (C) which has a maximum peak temperature of loss elastic modulus of higher than 47° C. and 85° C. or lower.

2. The laminate polyester film of claim 1, wherein the melting point of the copoly(ethylene-terephthalate/isophthalate) of the first layer is in the range of 210 to 245° C.

3. The laminate polyester film of claim 1, wherein the aromatic dicarboxylic acid component of the polyester forming the second layer is a combination of terephthalic acid and isophthalic acid, a combination of terephthalic acid and phthalic acid, or a combination of terephthalic acid, isophthalic acid and phthalic acid, and the above acid(s) other than terephthalic acid is(are) present in a proportion of 20 mol % or less of the total of the aromatic dicarboxylic acid component.

4. The laminate polyester film of claim 3, wherein the above acid(s) other than terephthalic acid is(are) present in a proportion of about 1 to 12 mol % of the total of the aromatic dicarboxylic acid component.

5. The laminate polyester film of claim 1, wherein the aliphatic dicarboxylic acid component is adipic acid.

6. The laminate polyester film of claim 1, wherein the aliphatic dicarboxylic acid component is present in a proportion of 12 mol % or less of the total of the aliphatic dicarboxylic acid component and the aromatic dicarboxylic acid component.

7. The laminate polyester film of claim 1, wherein ethylene glycol, diethylene glycol, and tetramethylene glycol are present in a proportion of 63 to 98.5 mol %, 1 to 2 mol % and 0.5 to 36 mol %, of the aliphatic diol component, respectively.

8. The laminate polyester film of claim 1, wherein the second layer is prepared from a molten mixture of copoly(ethylene-terephthalate/isophthalate) having a melting point of 210 to 245° C. and copoly(tetramethylene terephthalate/adipate) having a melting point of 170 to 223° C.

9. The laminate polyester film of claim 8, wherein the molten mixture comprises 99 to 60 wt % of copoly(ethylene-terephthalate/isophthalate) and 1 to 40 wt % of copoly(tetramethylene terephthalate/adipate).

10. The laminate polyester film of claim 8, wherein the copoly(tetramethylene terephthalate/adipate) has terminal carboxyl groups in an amount of 1 to 40 eq/$10^6$ g.

11. The laminate polyester film of claim 8, wherein the copoly(tetramethylene terephthalate/adipate) contains only 0.5 wt % at most of oligomers.

12. The laminate polyester film of claim 8, wherein the copoly(ethylene-terephthalate/isophthalate) and the copoly(tetramethylene terephthalate/adipate) have a reaction rate (EE, %), as defined by the following equation, of 3% or higher:

$$EE\ (\%) = SB/(SA+SB+SC) \times 100$$

wherein SA, SB and SC are integral values of peak A, peak B and peak C clearly distinguishable from one another in an $^1$H-NMR chart, respectively, the peak A is based on proton $H_A$ having a structure represented by the following formula:

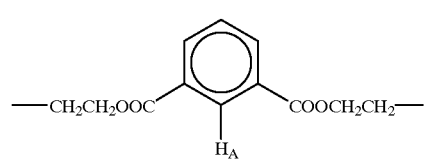

the peak B is based on proton $H_B$ having a structure represented by the following formula:

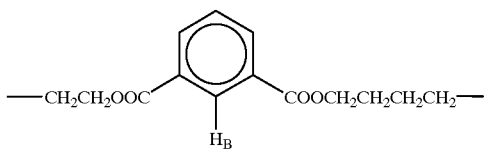

and the peak C is based on proton $H_C$ having a structure represented by the following formula.

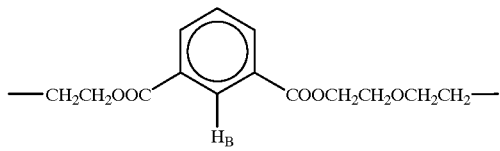

13. The laminate polyester film of claim 1, wherein the polyester forming the second layer contains a titanium compound soluble in the polyester in an amount of 50 to 160 ppm in terms of elemental titanium.

14. The laminate polyester film of claim 1, wherein the second layer is prepared from a molten mixture of copoly (ethylene-terephthalate/isophthalate) and copoly (tetramethylene terephthalate/adipate) and has one melting point different from the melting points of these copolyesters or has two melting points, one of which is different from the melting points of these copolyesters, and the other is either one of the melting points of the copolyesters.

15. The laminate polyester film of claim 1, which has the maximum peak temperature of loss elastic modulus of 50 to 85° C.

16. The laminate polyester film of claim 1, wherein the polyester forming the second layer comprises copoly (ethylene-terephthalate/isophthalate) and copoly (tetramethylene terephthalate/adipate) and at least one of the polyesters contains an antioxidant.

17. The laminate polyester film of claim 16, wherein the antioxidant is tetrakis-[methylene-3-(3',5'-di-tert-butyl-4'-hydroxyphenyl)propionate]methane.

18. The laminate polyester film of claim 1 which has a thickness of 6 to 75 μm.

19. The laminate polyester film of claim 1, wherein the ratio of the thickness of the first layer to that of the second layer is in the range of 0.02 to 0.67.

20. A method for using a laminate polyester film, which comprises laminating the laminate polyester film of claim 1 onto a metal plate for making a metal can by deep drawing.

* * * * *